[19] United States Patent
Cuk et al.

[11] Patent Number: 5,442,539
[45] Date of Patent: Aug. 15, 1995

[54] CUK DC-TO-DC SWITCHING CONVERTER WITH INPUT CURRENT SHAPING FOR UNITY POWER FACTOR OPERATION

[75] Inventors: Slobodan Cuk, Laguna Hills; Milivoje Brkovic, Pasadena, both of Calif.

[73] Assignee: California Institute of Technology, Pasadena, Calif.

[21] Appl. No.: 956,669

[22] Filed: Oct. 2, 1992

[51] Int. Cl.6 .......................................... H02M 7/217
[52] U.S. Cl. ........................................ 363/89; 363/16
[58] Field of Search .......................... 363/16, 37, 89; H02M 7/02, 7/04, 7/06

[56] References Cited

U.S. PATENT DOCUMENTS 4,184,197  1/1980  Cuk et al. ............................... 363/16
4,257,087  3/1981  Cuk ........................................ 363/16

FOREIGN PATENT DOCUMENTS 3-207268  9/1991  Japan ........................... H02M 7/06

OTHER PUBLICATIONS

S. D. Freeland, "Input Current Shaping for Single-Phase Ac-Dc Power Converters," Ph.D. Thesis, Part II, California Institute of Technology, Dec. 1988 pp. 174–192 only.
L. H. Dixon, Jr., "High Power Factor Pre-regulators for off-line Power Supplies," Unitrode Power Supply Design Seminar SEM-800, Dec. 1991, pp. I2-1-I2-16.
M. J. Kocher, et al., "An Ac to Dc Converter with High Quality Input Waveforms," IEEE Power Electronics Specialists Conference, Jun. 1982 Record, pp. 63–75, (IEEE Publication 82CHI762-4).
J. Sebastian, et al., "Improving Power Factor Correction in Distributed Power Supply Systems Using PWM and ZCSQR Sepic Topologies," IEEE Power Elec. Spec. Conf., Apr. 1991 Record, pp. 780–791, (IEEE Pub. 91CH3008-0).
D. Chambers, et al., "Dynamic P.F. Correction in Capacitor Input Off-Line Converters," Proc. Sixth National Solid-State Power Conference (POWERCON 6), Miami Beach, Fla., May 2-4, 1979, pp. B3.1-6.
B. Andreycak, "Controlled On-Time, Zero Current Switched Power Factor Correction Technique," Unitrode Switching Regulated Power Supply Design Seminar Manual, SEM-800, Sep. 1991, pp. 3.1-3.10.
R. Erickson, et al., "Design of a Simple High-Power-Factor Rectifier Based on the Flyback Converter," IEEE Applied Power Electronics Conference, Oct. 1990 Record, pp. 792–801.
S. Cuk, "Discontinuous Inductor Current Mode in the Optimum Topology Switching Converter," IEEE Power Electronics Specialists Conference, Syracuse, N.Y., Jun. 13–15, Jun. 1978, pp. 105–123.
S. Cuk, et al., "Coupled-Inductor Analysis and Design," IEEE Power Electronics Specialists Conference, Vancouver, Canada, Jun., 1986.

*Primary Examiner*—Jeffrey L. Sterrett
*Attorney, Agent, or Firm*—A. M. Fernandez

[57] ABSTRACT

A DC voltage to a load is provided from a rectified AC power line source with unity power factor using Cuk dc-to-dc switching converter, either unisolated or isolated extensions, operated as an automatic current shaper with unity power factor performance. This is obtained by operating the Cuk converter in a discontinuous inductor current mode (DICM) at a constant switching frequency and constant duty ratio without input current feedback control customarily used, but operating in an open-loop fashion. Even though the Cuk converter is operated in DICM, its input current is nonpulsating and flowing throughout the switching cycle, unlike other converters having pulsating input current in DICM, thus reducing input harmonic currents due to switching frequency and its harmonics. Further improvement is obtained and even the remaining ripple in the input current is entirely eliminated to result in ideal, clean, harmonic-free input current waveform with unity power factor performance, when the coupled-inductor and/or integrated magnetics extensions of the Cuk converter conditions are implemented. They could be operated at low to moderate switching frequency, thus providing high efficiency and without the need for additional input filtering customarily used in other converters.

6 Claims, 8 Drawing Sheets

CUK DC-TO-DC SWITCHING CONVERTER WITH INPUT CURRENT SHAPING FOR UNITY POWER FACTOR OPERATION

FIELD OF THE INVENTION

The invention relates to a Cuk dc-to-dc switching converter operated in a discontinuous inductor current mode (DICM) from a rectified AC power source for a new use, namely, input current shaping without current feedback control, and for unity power factor performance while operating at both a constant duty ratio and a constant switching frequency but with voltage feedback control of the duty ratio for output voltage regulation.

BACKGROUND ART

Recent international regulations governing the power quality and harmonic currents pollution of utility power lines has placed an increased emphasis on the problem of interfacing electronic DC loads to the AC utility power line with an ac-to-dc converter. The conventional way of doing this ac-to-dc conversion is to use a full-wave bridge rectifier and a capacitor-input filter followed by a voltage regulator (dc-to-dc converter).

The main problem associated with a capacitor-input filter is that narrow-pulse, high peak currents result which produce high harmonic currents on the utility line. These large harmonic currents are undesirable because they produce distortion of the line voltage and conducted and radiated electromagnetic interference (EMI). Only the components of input current which are of the same frequency and in phase with the input voltage deliver active power to the load. For ideal sinewave line voltage, higher order harmonic currents do not contribute to load power but only generate the increased rms currents in the transmission lines and, therefore, produce additional losses. When input current is made proportional to the line voltage, maximum active power is delivered and ideal unity power factor is achieved.

The increasing number of electronic DC loads that are being connected to an AC power line and their sensitivity to the quality of the line voltage require from the designer and user of an AC power line consideration of not only the DC voltage provided but also the quality of the input current. Thus, the following objectives are presented which may be closely related but not identical: achieving unity power factor; and minimizing harmonic current content. In the special case of an ideal sine-wave line voltage, these two objectives are identical. However, the line voltage contamination with harmonic currents is the more severe problem which will be regulated by international regulations, such as IEC 555-2 coming into effect in December 1994.

Close voltage regulation is essential when an ac-to-dc converter is to supply DC voltage to sensitive loads. In applications requiring a converter with multioutput voltages, or in distributed power supply systems, a good solution is to have a front-end input current shaper with a single isolated output (DC bus voltage) and one or more down-stream post-regulators (dc-to-dc converters) to provide close regulation on each DC output voltage. This approach has several advantages: isolation and safety requirements are satisfied in the current shaper; and the regulation of the DC bus voltage does not have to be very tight nor have fast response since the post-regulators are present.

The process of improving the input-current waveform of an ac-to-dc converter with the goal of alleviating problems of noise and line-voltage distortion and improving the power factor is called input current shaping, and a device which can perform input current shaping is referred to hereinafter as a current shaper. For a maximum power delivery and therefore unity input power factor, every current component drawn from the line must be related to its corresponding voltage component by a common scalar. So, if the line voltage is distorted, the input current also needs to be distorted. Therefore, the current shaper needs to behave like a resistor, i.e., needs to emulate a resistor.

The functions of the current shaper are: to shape the input current; to "balance" the difference between input and output power; to provide output voltage regulation; and optionally to provide isolation between the line and the load.

The use of active methods for input current shaping based on a switching dc-to-dc converter is the best way to achieve high input power factor. There are numerous papers describing application of various dc-to-dc converters in current shaping applications. [S. D. Freeland, "Input Current Shaping for Single-Phase Ac-Dc Power Converters," Ph.D. Thesis, Part II, California Institute of Technology, 1988; L. H. Dixon, Jr., "High Power Factor Pre-regulators for off-line Power Supplies," Unitrode Power Supply Design Seminar SEM-800, 1991, pp. I2-1-I2-16; M. J. Kocher and R. L. Steigerwals, "An Ac to Dc Converter with High Quality Input Waveforms," IEEE Power Electronics Specialists Conference, 1982 Record, pp. 63–75 (IEEE Publication 82CHI762-4); and J. Sebastian, J. Uceda, J. A. Cobos, J. Arau, F. Aldana, "Improving Power Factor Correction in Distributed Power Supply Systems Using PWM and ZCS-QR Sepic Topologies," IEEE Power Electronics Specialists Conference, 1991 Record, pp. 780–791 (IEEE Publication 91CH3008-0). All of the converters usually operate in continuous conduction mode (CCM), and control circuits widely used are based on programming input current to be proportional to the line voltage by closing an input current feedback loop.

Using dc-to-dc converters in discontinuous inductor current mode (DICM) of operation for input current shaping applications is very attractive for low power levels because very simple control circuits can be used [D. Chambers and D. Wang, "Dynamic P. F. Correction in Capacitor Input Off-Line Converters," Proc. Sixth National Solid-State Power Conference (POWERCON 6), Miami Beach, Fla., May 2-4, 1979, pp. B3.1-6]. When a converter operates at constant switching frequency and constant duty cycle current, shaping is obtained automatically.

A boost converter operating in DICM is very often used as a current shaper for low power applications where isolation between line and load is not required. When it operates as an "automatic" current shaper, the input current is not a linear function of the line voltage, and an input power factor greater than 0.97 is theoretically possible for a conversion ratio M > 1.5 [S. D. Freeland, supra]. An alternative method is to operate at the boundary between continuous and discontinuous inductor current mode (CICM and DICM), but it requires a variable switching frequency and a complex control circuit with a multiplier. [B. Andreycak, "Controlled ON-Time, Zero Current Switched Power Factor Correction Technique," Unitrode Switching Regulated Power Supply Design Seminar Manual, SEM-800, 1991, pp. 3.1–3.10]. The disadvantage of this control method is that switching frequency varies over a wide range with load and line voltage which in many applications is unacceptable. Although a current shaper using a boost converter is very simple and popular, it has some very serious practical drawbacks, such as:

Output voltage is always higher than the peak input voltage;
Isolation cannot be easily implemented;
High in-rush current exists during start-up;
There is no overload protection because there is no active switch between input and output.

Also, the output capacitor will attempt to charge resonantly to twice the input voltage during start-up which cannot be tolerated in distributed power supply systems. To solve these problems effectively, an additional active switch and its control circuit are needed.

A flyback converter is very popular when operating in DICM since the average input current exactly follows the input voltage if switching frequency and duty ratio are kept constant. [S. D. Freeland, supra; D. Chambers, et al., supra; and R. Ericson, M. Madigan and S. Singer, "Design of a Simple High-Power-Factor Rectifier Based on the Flyback Converter," IEEE Applied Power Electronics Conference, 1990 Record, pp. 792–801]. Sepic converters have also been proposed as automatic current shapers operating in DICM [J. Sebastian, et al., supra]. Both types of converters overcome drawbacks associated with a dc-to-dc converter used as a current shaper for low power applications.

When a dc-to-dc converter operates in DICM, the high switching current ripple is present with a magnitude at least twice the average value of the input current for variable switching frequency, or even higher if the switching frequency is kept constant. High switching frequency and additional filtering are required to reduce harmonic distortion, and to get a high input power factor. Neither of these approaches are optimal since they reduce overall efficiency of the current shaper and increase size, weight and number of magnetic components.

BRIEF DESCRIPTION OF THE INVENTION

The present invention overcomes the deficiencies of the prior art with an input current shaper based on a Ćuk dc-to-dc converter operating in DICM. This converter operates as an ideal automatic shaper with a constant switching frequency and duty ratio, and at the same time with a simple duty ratio control using output voltage feedback for voltage regulation. Thus, the converter input port behaves as a resistor called an "emulated resistor $R_{em}$" without a current feedback loop, and the output voltage is controlled by varying the resistance $R_{em}$ through a voltage feedback loop. The crossover frequency of this feedback loop must be much lower than 120 Hz to preserve high input current waveform quality.

The basic Ćuk dc-to-dc converter, even when operated in DICM, unlike all other switching converters, has nonpulsating input current (i.e., input current flows throughout the whole switching cycle), therefore the input current ripple can be easily filtered out. Even this small input current ripple can be entirely eliminated without increasing switching frequency, inductance or using an additional filter, by use of the coupled inductor extension of the basic Ćuk converter. An isolated version of the Ćuk converter maintains all of the above advantages of the Ćuk converter and provides additional important isolation property between AC line and load.

The coupled input and output inductors and the isolation transformer may be advantageously integrated into one magnetic structure in order to steer current ripple from input and output inductors into the transformer where AC current (magnetizing current) already exists, thus providing ripple free input and output currents.

In operation of the Ćuk dc-to-dc switching converter, the average input current does not appear to be directly proportional to instantaneous input voltage. It is therefore not apparent that it may be used in DICM as a current shaper without a current feedback loop, i.e., that it may be used open loop with a constant duty ratio and constant switching frequency for providing unity power factor from a full-wave AC voltage rectifier connected to an AC power line. At the same time a voltage feedback loop may be provided to regulate the DC voltage output through control of the switching duty ratio. The average input current will automatically follow the instantaneous input voltage during voltage regulation if the input voltage is a rectified sine wave and thus by definition have unity power factor.

DETAILED DESCRIPTION OF THE INVENTION

Using dc-to-dc converters in discontinuous inductor current mode (DICM) for current shaping applications is very attractive for low power levels because a very simple control circuit can be used. When the converter operates at constant switching frequency and constant duty ratio, averaged input current follows input voltage so shaping is obtained automatically.

Figure 1A:
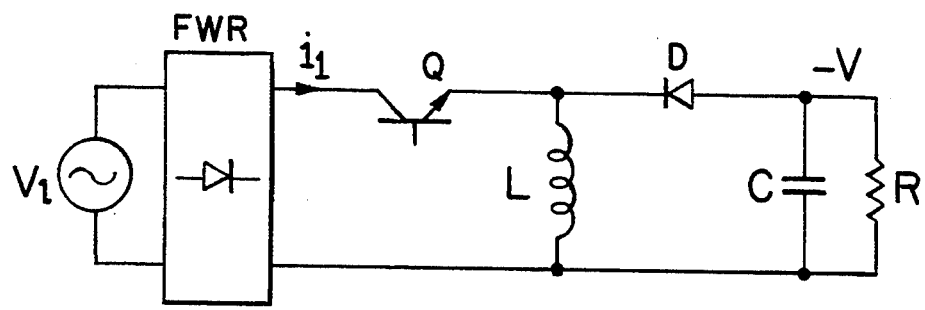
FIG. 1a is a schematic diagram of a conventional flyback converter connected to a voltage source $V_1$ by a full-wave rectifier represented by a diode in a block.
Figure 1B:
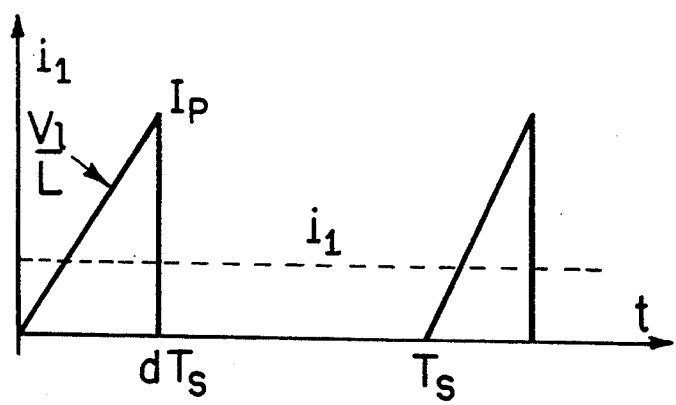
FIG. 1b is a graph of input current during a switching period $T_s$.

A prior-art flyback converter operating in DICM shown in FIG. 1a is very often used for low power levels and provides unity power factor operation. This can be seen very easily from the input current waveform shown in FIG. 1b. Average input current is given by $$\bar{i}_1 = \frac{1}{2} I_p d = \frac{1}{2} \frac{d^2 T_s}{L} v_\ell, \quad (1)$$

and if the duty ratio and the switching frequency are kept constant, it is a linear function of the input voltage. Notice that input voltage $v_\ell(t)$ can be an arbitrary waveform. If emulated resistance is defined as $$R_{em} = \frac{2L}{T_s d^2}, \quad (2)$$

then Equation (1) can be written in the form $$\bar{i}_1(t) = \frac{v_\ell(t)}{R_{em}}, \quad (3)$$

from which it can be seen that the flyback converter operating in DICM emulates resistance for all operating conditions with no control. This unusual feature is proposed in D. Chambers, et al., supra, and detailed analysis for other converters is outlined in S. D. Freeland, supra.

A Ćuk converter also has the above property when used as a current shaper if operated in DICM, even though it appears not to be the case. The main reason for this is that in the converter described by S. Ćuk, "Discontinuous Inductor Current Mode in the Optimum Topology Switching Converter," IEEE Power Electronics Specialists Conference, Syracuse, N.Y., Jun. 13-15, 1978, pp. 105-123, an unusual behavior has only now been discovered. This unusual behavior will now be described in the following analysis beginning with a reference to FIGS. 2, 3a and 3b.

Figure 2:
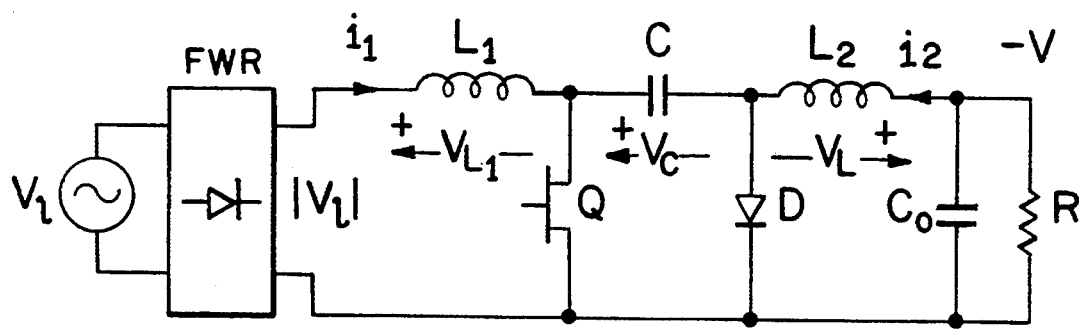
FIG. 2 is a schematic diagram of a basic Ćuk converter with separate inductors.
Figure 3A:
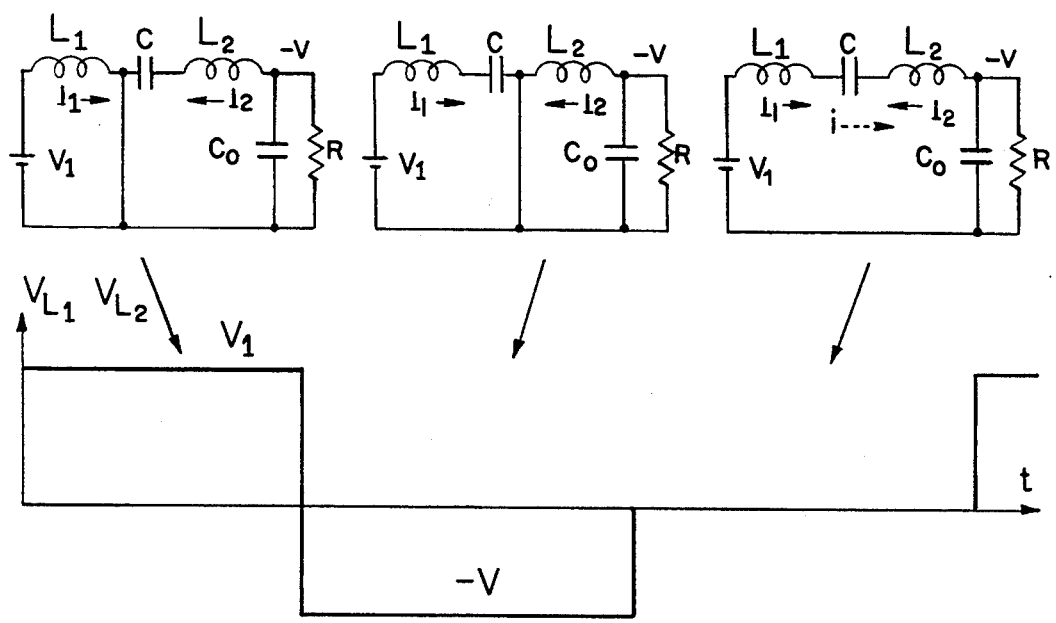
FIG. 3a illustrates schematically three switched network configurations for the basic Ćuk converter shown in FIG. 2 when operated in a discontinuous inductor current mode (DICM) together with a graph of the current of diode D during the three network states shown during a complete switching cycle.
Figure 3B:
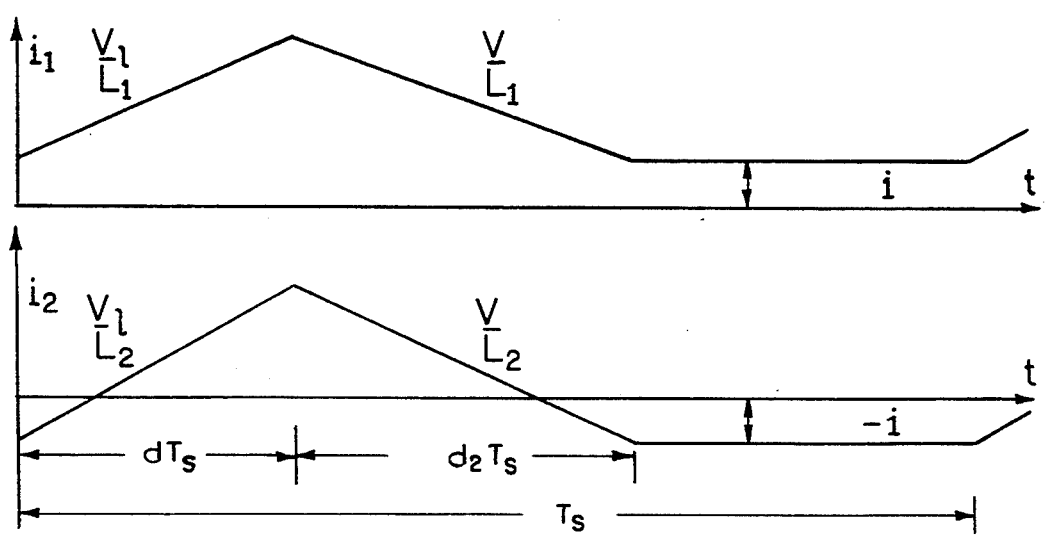
FIG. 3b is a graph of waveforms used for determination of steady state in DICM of the three network configurations of FIG. 3a during a switching cycle.

The basic Ćuk converter with separate inductors is shown in FIG. 2 and three switched networks and waveforms used for the analysis are shown in FIGS. 3a and 3b, respectively. If the switching frequency is much higher than the utility line frequency, the waveforms averaged over the switching period $T_s$ can be used in the following steady-state analysis [S. D. Freeland, supra], which assumes that efficiency of the converter is 100% so the input power equals the output power.

From the volt-second balance on the inductors, the following equation follows $$\frac{v}{v_\ell} = \frac{d}{d_2}, \quad (4)$$

and from the power balance (100%) efficiency $$\frac{\bar{i}_1}{\bar{i}_2} = \frac{d}{d_2}. \quad (5)$$

The first switched network shown in FIG. 3a is present while the transistor Q in the circuit of FIG. 2 is on and the diode D is switched off. The second switched network is present when the transistor Q is turned off and the diode D is turned on. The onset of DICM in the basic Ćuk converter, with separate inductors as shown in FIG. 2, occurs when the diode current, which is the sum of input and output inductor currents becomes zero. This leads to existence of constant current level i (when the diode D is turned off) [S. Ćuk, 1978, supra]. The third network shown in FIG. 3a is then present when both transistor Q and diode D are off. Using results from S. Ćuk, 1978, supra, and referring to the waveforms in FIG. 3b, the following expression for the averaged input current over one switching period can be written as:

$$\bar{i}_1 = \frac{v_\ell}{2L_1} dT_s[d + d_2] + i, \quad (6)$$

where i is the current which exists in both inductors after diode D ceases to conduct. From Equation (6) it appears that average input current $\bar{i}_1$ is not proportional to line voltage, $v_\ell(t)$, for a constant duty ratio d, since both $d_2$ and i are also strong functions of $v_\ell(t)$. The following derivation, however, proves that $\bar{i}_1$ is indeed linearly dependent on $v_\ell(t)$. From FIG. 3b, the average output inductor current is:

$$\bar{i}_2 = \frac{v_\ell}{2L_2} dT_s[d + d_2] - i, \quad (7)$$

The sum of input and output currents gives $$\bar{i}_1 + \bar{i}_2 = \frac{1}{2} \frac{v_\ell}{L_e} dT_s(d + d_2), \quad (8)$$

here, $$L_e = \frac{L_1 L_2}{L_1 + L_2} = L_1 \| L_2, \quad (9)$$

is effective inductance of the converter. By substitution of Equation (5) into Equation (8)

$$\bar{i}_1\left(1 + \frac{d_2}{d}\right) = \frac{1}{2} \frac{v_\ell}{L_e} dT_s\left(1 + \frac{d_2}{d}\right)d, \quad (10)$$

which after cancellation of terms in brackets results in $$\bar{i}_1(t) = \frac{1}{2} \frac{d^2 T_s}{L_e} v_\ell(t). \quad (11)$$

A rather surprising result is obtained: Equation (11) has the same form as Equation (1) for the flyback converter. The only difference is that in Equation (11) equivalent inductance (Equation (9)) is used. If, as for the flyback converter, emulated resistance is defined as $$R_{em} = \frac{2L_e}{T_s d^2}, \qquad (12)$$

then Equation (11) is exactly the same as Equation (3), by keeping the duty ratio and the switching frequency constant, the average input current in the Ćuk converter operating in DICM also follows the input voltage exactly. It should be noted that input voltage is not specified in this analysis and hence can be an arbitrary waveform. Therefore, it has been discovered that the Ćuk converter may be used as an ideal current shaper, and that it performs current shaping automatically without current feedback control when operating in DICM, even in the presence of voltage feedback control of duty ratio for the regulation of the output voltage.

The operation of the converter in DICM is clearly a very distinct advantage when compared with input current shapers based on continuous conduction mode. In the latter, duty ratio is varied over a wide range (from about 0 to 1) to accommodate change of input voltage from 0 V to maximum and to actively force through feedback the input current to follow the rectified line voltage. As in all feedback systems, the potential for instability and oscillations exists, which puts additional requirements on the design of the power stage to insure stable operation over all operating conditions. The practical implementation also requires addition of an expensive integrated circuit designed specifically for unity power factor control. Such current feedback is not required by the Ćuk converter used as an ideal current shaper, since input current shaping is provided in an open-loop fashion. The voltage feedback loop may still be provided to regulate the output voltage against line voltage variations and load current changes.

Figure 4:
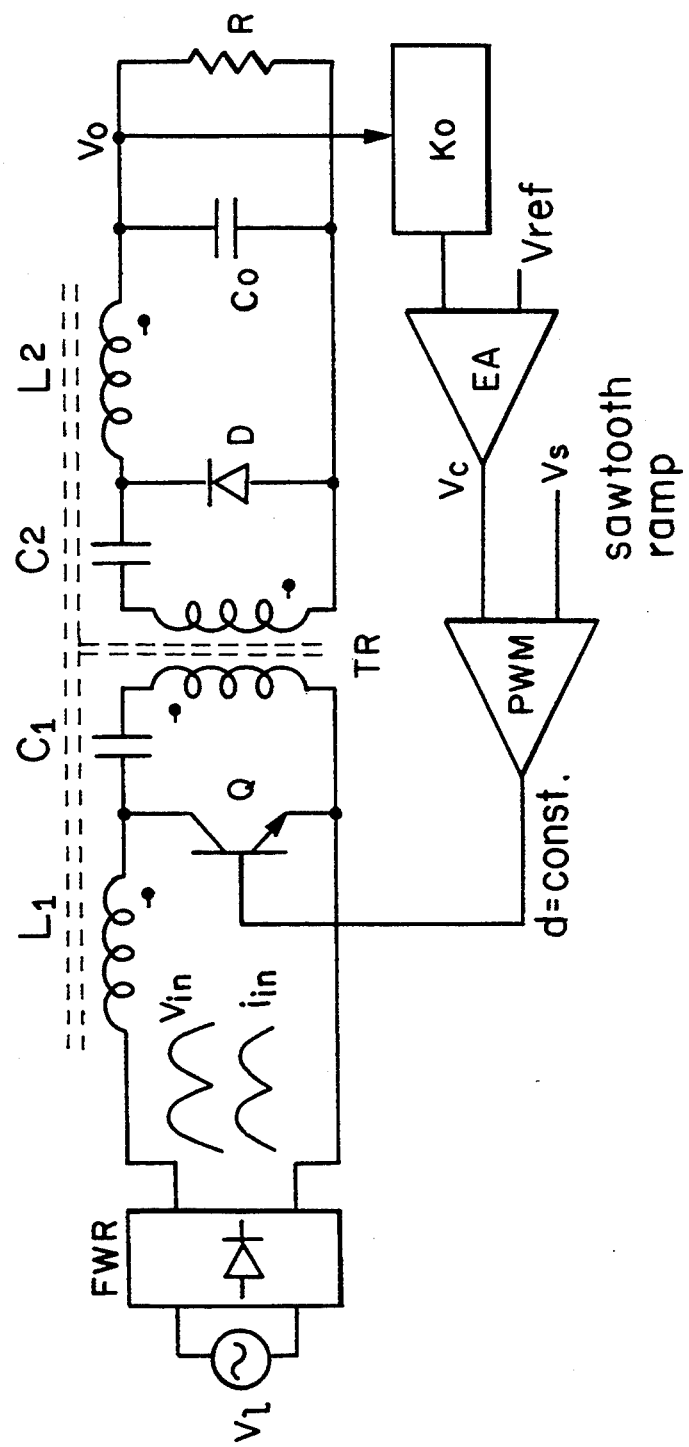
FIG. 4 is a schematic diagram of an integrated magnetics extension of the basic Ćuk converter shown in FIG. 2 with coupled inductors $L_1$, $L_2$ and an isolation transformer TR coupled into one magnetic core structure as shown with dashed lines, and voltage regulation feedback.

The basic input current shaper of the present invention with simple control is shown in FIG. 4. The line voltage $V_\ell$ is the sine wave $\sqrt{2}V_\ell \sin(\omega_\ell t)$ with rms value $V_\ell$ and radian frequency $\omega_\ell$. It will be more convenient to use rms value of the input voltage and input current waveforms. The line current or input current has rms value $I_\ell$. With assumption of a small ripple on the output, dc values of output voltage V and load current I can be used instead of their rms values. The input line voltage is rectified through a full-wave rectifier FWR so the input voltage to the dc-dc Ćuk converter is $\sqrt{2}|V_\ell \sin(\omega_\ell t)|$. The current shaper is an ac-dc power processor with an "effective" rms conversion ratio defined by $$M = \frac{V}{V_\ell}, \qquad (13)$$

and conversion ratio for a Ćuk converter in DICM is given by $$M = \frac{d}{\sqrt{K_e}}, \qquad (14)$$

where, $$K_e = \frac{2L_e}{RT_s}, \qquad (15)$$

is a conduction parameter.

The output voltage regulation is provided by closing a voltage feedback loop through a reference error amplifier EA and a pulse width modulator (PWM) comparator, as shown in FIG. 4. The block labeled Ko that couples the output voltage Vo to the comparator EA provides a scaling factor for the regulated output voltage. The output voltage is compared with a reference signal $v_{ref}$ and amplified error signal $v_c$ is compared with a sawtooth ramp signal $V_s$ producing a duty ratio signal d for the switching transistor Q. To keep output voltage constant, the duty ratio is modulated by the error signal, $v_c$. By modulating the duty ratio, the emulating resistance $R_{em}$ (Equation (12)) is also modulated thus controlling the input power drawn from the line. Therefore, with the output voltage feedback loop closed, duty ratio d and consequently emulating resistance $R_{em}$ will be a function of the control voltage $v_c$. The bandwidth of the voltage loop is limited to the frequency well below 120 Hz in order to keep distortion in the input current at low level. In this manner, automatic current shaping and slow voltage regulation can be obtained with simple control. It should be pointed out that standard pulse-width modulation (PWM) integrated circuits used for dc-to-dc converters can be used in current shapers without any additional circuitry.

As shown in S. Ćuk, 1978, supra, the Ćuk converter will operate in DICM.

$$K_{e(max)} < \frac{1}{(M_{max} + 1)^2} \qquad (16)$$

where, $$K_{e(max)} = \frac{2L_e}{R_{min}T_s}, \qquad (17)$$

is maximum value of conduction parameter which occurs at maximum output power level (minimum load resistance), and $M_{max}$ occurs at minimum of the line voltage. From Equations (16) and (17) minimum value of equivalent inductance required for DICM of operation can be determined.

$$L_{e(min)} < \frac{R_{min}T_s}{2(1 + M_{max})^2}. \qquad (18)$$

Nonidealities which Cause Current Waveform Distortion

Two main nonidealities, inherent to any dc-to-dc converter topology used in ac-to-dc applications, which produce input current waveform distortion and reduce input power factor are: "lag" effect in the initial current at cusp of the input voltage; and switching current ripple [S. D. Freeland, supra]. The "lag" effect can be reduced by using small inductance, which is the case in DICM, but switching ripple current can, in general, be reduced by increasing either switching frequency or inductance, or even with additional filtering, although the latter alternative is not necessary and should be avoided.

Figure 5A:
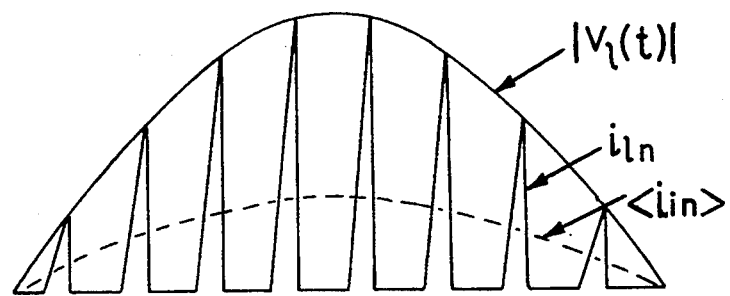
FIGS. 5a, b and c illustrate for comparison input current waveforms for flyback, Ćuk converter, and coupled inductor Ćuk converter, respectively.
Figure 5I:
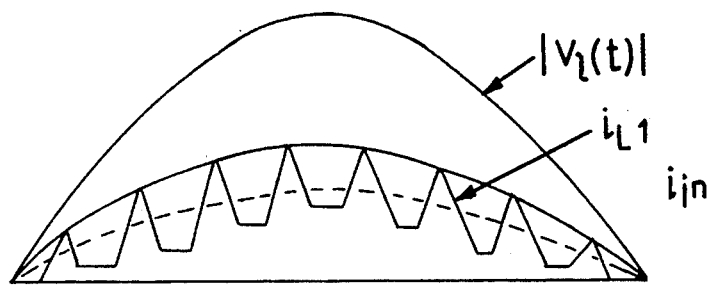
Figure 5C:
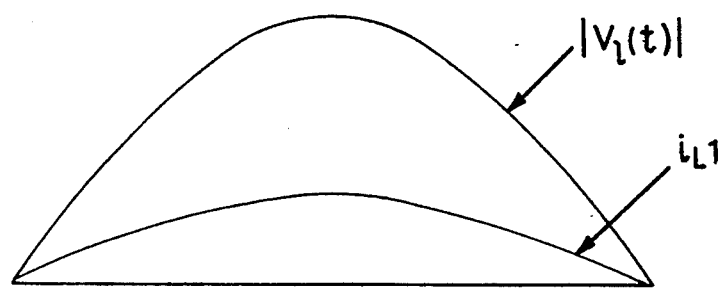

The input current waveforms for the flyback, the Ćuk converter and coupled-inductor Ćuk converter operating in DICM are shown in FIG. 5a, b and c, respectively. As can be seen, the input current in the flyback converter (FIG. 5a) consists of current pulses with very high peaks which are in every switching cycle forced to start and return to zero current levels. On the other hand, the input current in the Ćuk converter contains much smaller switching ripple (FIG. 5b), since input current does not go to zero after the diode D stops conducting. In fact, the input current in the Ćuk converter is flowing throughout the whole switching cycle (nonpulsating input current) even in DICM, thereby reducing harmonic currents to a minimum due to switching frequency and its harmonics. Finally, FIG. 5c shows that even the remaining small ripple in the input current can be completely eliminated to result in ideal, clean, harmonic-free input current waveforms when the coupled-inductor extension of the Ćuk converter designed to meet a zero-ripple condition is implemented.

Since the transistor peak current and AC flux swing in the cores are relatively high in DICM, high switching frequency will not give high efficiency. Consequently, an alternative method for reducing ripple current without increasing switching frequency is clearly desired as shown below.

Figure 6:
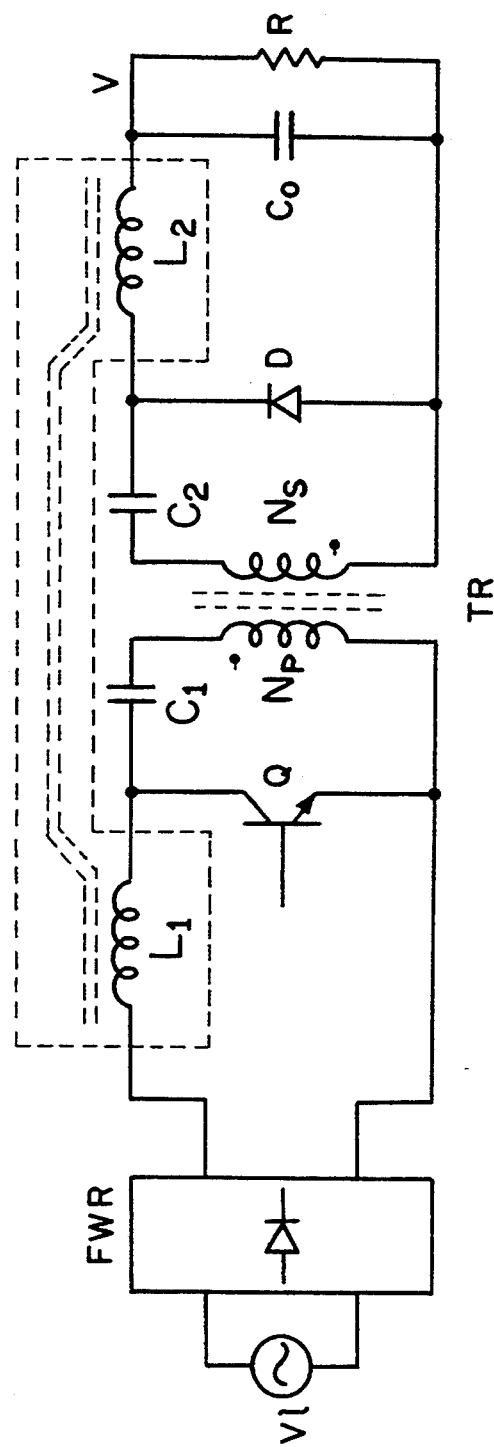
FIG. 6 illustrates an isolated version of the Ćuk converter having a small high-frequency isolation transformer, and input and output inductors $L_1$, $L_2$ coupled into one magnetic core as shown with dashed lines.

In applications where isolation between line and load is required, a high frequency transformer can be added as shown in FIG. 6. In this case, even though the transformer is ungapped and very small at high frequencies, three separate magnetic structures still need to be used.

To obtain ideal current shaping, the size of magnetics are required to be small, switching frequency should not be too high and additional filtering should be eliminated. The solution for this is to use coupled-inductors $L_1$ and $L_2$ with an isolation transformer TR which combine input and output inductors $L_1$ and $L_2$ into one magnetic core as described below, or an integrated-magnetics topology may be used which combines all magnetic components into a single core as described below.

In-Rush Current and Overload Protection

It should be noted that the input inductor in the basic Ćuk converter is connected to the energy transfer capacitor C (FIG. 2) instead of directly to the output storage capacitor $C_o$ as in the boost converter. The size of the energy transfer capacitor C is determined by the magnitude of the switching voltage ripple which can be tolerated. This capacitor should be as small as possible to minimize its size and to provide better dynamics.

The output capacitor $C_o$ needs to be sufficiently large for two reasons: to store minimum energy required for balancing the difference between the time varying input power and constant load power; and to provide enough energy required for hold-up during blackouts or brown-outs of the line voltage.

In a practical design, the energy transfer capacitor C is chosen such that switching voltage ripple on it is about 20% of dc voltage value, and therefore it is almost three orders of magnitude smaller than the output capacitor $C_o$. Therefore, in-rush current during start-up is reduced by a factor of about 30, which eliminates the need for additional protection circuitry required in the boost converter. Similarly, the short circuit currents will be reduced by the same factor in comparison with the boost converter.

Coupled-Inductors Extension

The concept of coupled inductors is widely used in the design of Ćuk converters for various applications, and can also be used for input current shaping. In this case, the switching ripple current is eliminated from the input inductor and "steered" into the output inductor as disclosed in U.S. Pat. No. 4,184,197, incorporated herein by reference. This unique feature becomes very useful when the converter operates in DICM, the input current is continuous and ripple free. The price paid for this is in the output inductor current ripple which remains the same as before coupling.

It should be pointed out that steady-state analysis given above for the current shaper based on the Ćuk converter with separate inductors is valid also for coupled-inductors. The only difference is that effective inductance $K_e$ (Equation (9)) used for definition of the conduction parameter $K_e$ (Equation (15)) in the case of the coupled-inductors becomes $$L_e = L_2, \qquad (19)$$

since the switching current ripple is determined only by the output inductor $L_2$.

Using the coupled-inductors concept, both size and weight of magnetics are reduced simultaneously with an increase of efficiency and improvement of performance. Note that ripple current steering and zero-ripple current in the input inductor can be obtained by coupling the inductor over a very wide range of inductance values including very small values. Thus, even much smaller inductor values than initial inductance values (the inductance value at which the converter is forced to operate in DICM) still result in zero-ripple input current and DICM. Thus, the smaller size of magnetics can be utilized, and the "lag" effect in the input current reduced, while still preserving clean, ripple-free input current. Therefore, the input power factor will be improved by using coupled inductors. This feature becomes very useful since, even for DICM, neither additional filtering of the input current nor high switching frequency are necessary to obtain high input power factor as is needed for boost, flyback or buck converters.

In applications where isolation between line and load is required, a high frequency isolation transformer can be used. Even though the input and output inductors are integrated into one magnetic core, a separate magnetic core is needed for the transformer. Also, large switching ripple in the output current is present. In such applications, the concept of integrated magnetics is preferable, as will now be described.

Integrated-Magnetics Topology

Further improvement in the input current shaping can be achieved using the isolated version of the Ćuk converter with integrated magnetics as shown in FIG. 4. The input and output inductors and isolation transformer are integrated into one magnetic core structure. Switching current ripple from both the input and the output inductors is "steered" into the transformer windings where AC current (magnetizing current) inherently exists as disclosed in U.S. Pat. No. 4,257,087, incorporated herein by reference. This unique feature inherent in isolated Ćuk converter allows the size of magnetics to be kept small even at very modest switching frequency of 40 kHz, and high input power factor can be achieved without additional filtering either of the input or the output current.

The analysis given above with respect to current shaping is still valid for integrated magnetics designs. The difference is only in the effective inductance (which is now magnetizing inductance) of the transformer since the switching current ripple appears only in the transformer.

Detailed analysis and design procedure for integrated-magnetics structure is given in Slobodan Cuk and Zhe Zhang, "Coupled-Inductor Analysis and Design," June, 1986, IEEE Power Electronics Specialist Conference, Vancouver, Canada. What structure of the magnetic core will be used for design depends on few factors: cost of design; size and weight; and sensitivity of design and residual ripple. Sensitivity of the structure is actually the sensitivity of the ripple current to changes in the turns ratio and in the air-gap size. Residual ripple is the ripple current generated due to mismatch drive voltage waveforms on the windings of the integrated magnetics caused by second-order parasitic in the integrated magnetics and in the converter circuit. Both sensitivity and residual ripple can be reduced by increasing effective leakage inductance seen by the error voltage, i.e., integrated magnetics needs to be designed with as high leakage inductance as possible. The standard EE core with spacer can be used as a compromise between cost and performance.

The full advantages of the input current shaper using a Cuk converter with integrated magnetics becomes evident: zero switching current ripple in the input and the output inductors; isolation between line and load; wide range of input and output voltage; small size of magnetics; natural protection against in-rush current occurring at start-up or overload current; and high overall conversion efficiency at moderate switching frequency.

Experimental Results

To demonstrate high performance of the current shaper based on a Cuk converter with integrated magnetics operating in DICM, a 200 W prototype was designed for operation from 120 V/rms AC line. Output voltage was chosen to be 50 V/DC and 35 kHz switching frequency was selected.

Figure 7A:
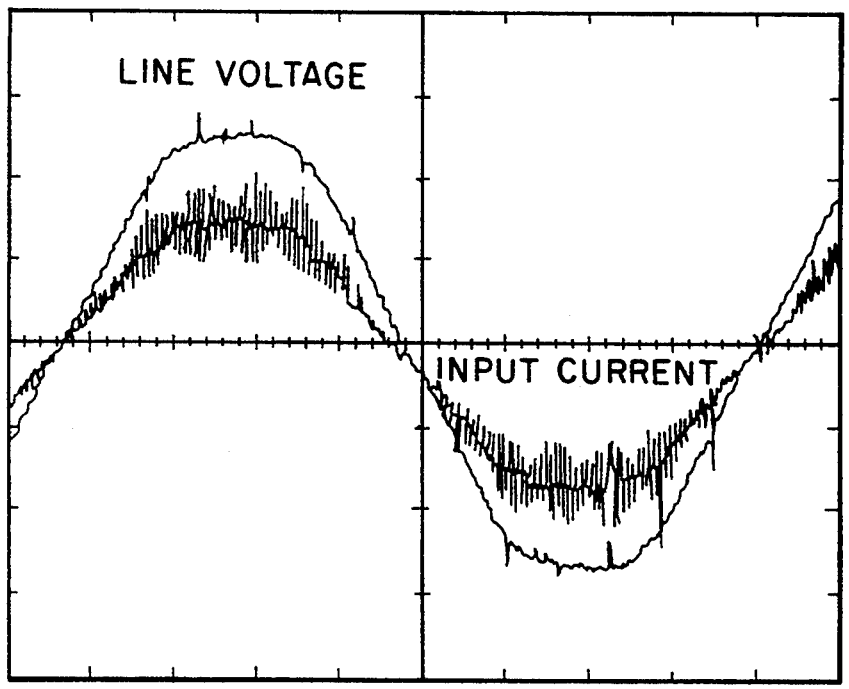
FIG. 7a illustrates waveforms in a current shaper based on a Ćuk converter in DICM of input current and line voltage during a line voltage period.
Figure 7B:
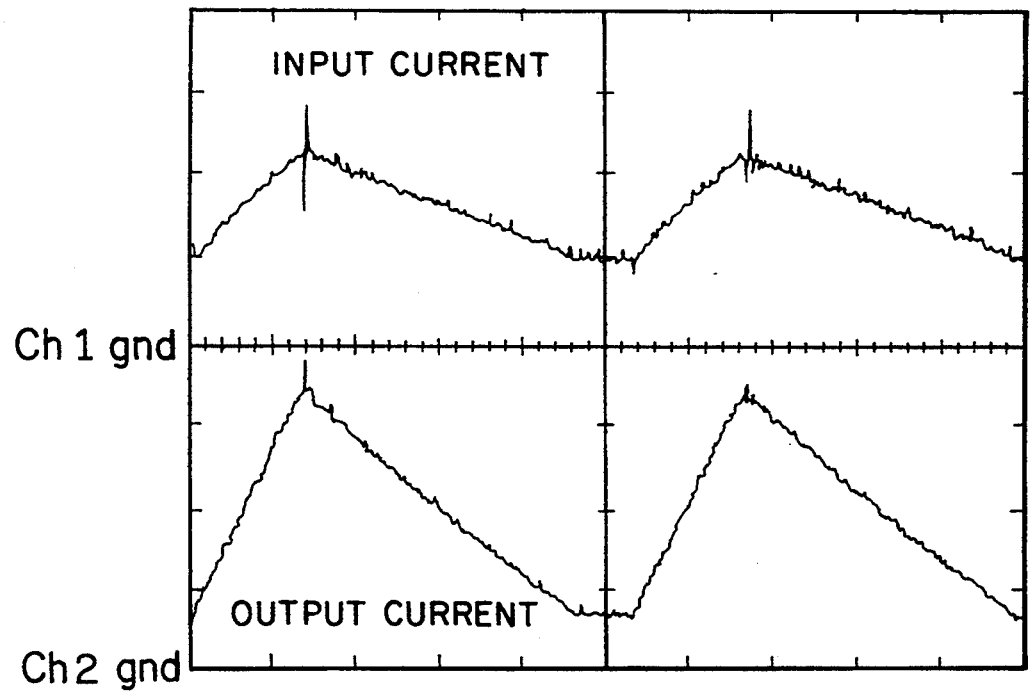
FIG. 7b illustrates waveforms in a current shaper based on a Ćuk converter in DICM of input current and output inductor current during a switching period at peaks of line voltage.

In order to demonstrate advantages of using integrated magnetics, first separate inductors were used. The component values referring to FIG. 2 were: $L_1 = 720$ μH, $L_2 = 15$ μH, $C_1 = $μF, $C_o = 22000$ μH, $R = 25\Omega$. For the transistor switch Q, the choice was IRF740, and for the diode D, the choice was SESS5403. Line voltage and current waveforms were plotted for output power of 100 W in FIG. 7a. Input current follows line voltage very well and is in phase. Input and output currents during switching period at the peak of the input voltage were plotted in FIG. 7b. The switching ripple of 1.2 A is present in the input current which is about 60% of its rms value, and switching ripple of 11 A is presented in the output inductor current which is 2.75 times bigger than 4 A peak current. To reduce switching ripple currents, additional filtering would be needed.

Next, a Cuk converter with integrated magnetics was tested. To reduce cost of design, a standard EE-42 core with a common spacer was used for the integrated magnetics design, even though the size and weight were not optimized. The transformer was wound on the center leg and input and output inductors were wound on the outer legs. The turns ratio of the transformer was chosen to be $n=2$. Number of turns and effective inductances are listed below together with other components (referring to FIG. 4): $N_1=93T$, $N_2=48T$, $N_p=32T$, $N_s=16T$, $L_1=710$ μH, $L_2=180$ μH, $L_p$ (Primary winding of TR)$=100$ μH, $C_1=2.2$ μF, $C_2=10$ μF, Q—IRF740, and D—10CTF40.

Figure 8:
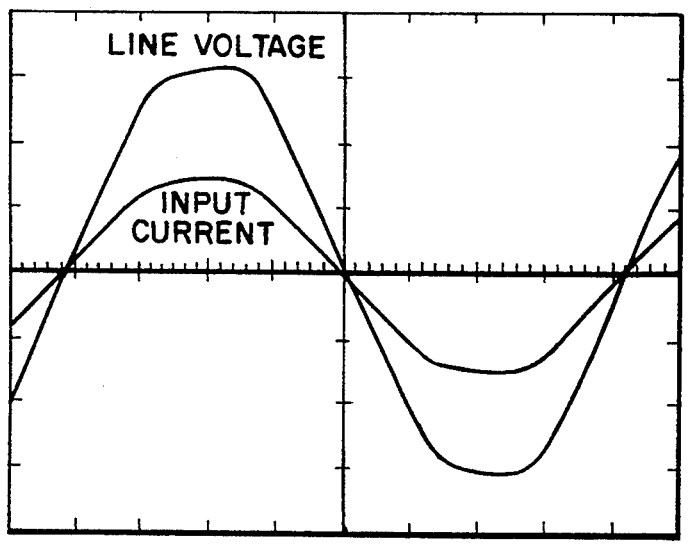
FIG. 8 is a graph of line voltage and input current in a current shaper based on a Ćuk dc-to-dc converter with integrated magnetics.
Figure 9A:
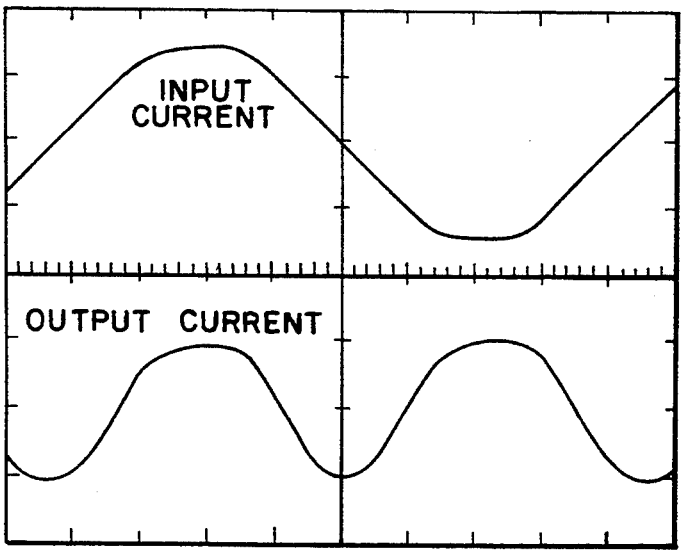
FIGS. 9a and b are graphs of measured input (top traces: 2A/div.) and output current (bottom traces 4A/div.) waveforms at full output power of 200 W during line period (time scale: 2 ms/div.) and during switching period time (time scale: 5μs/div.), respectively.
Figure 9B:
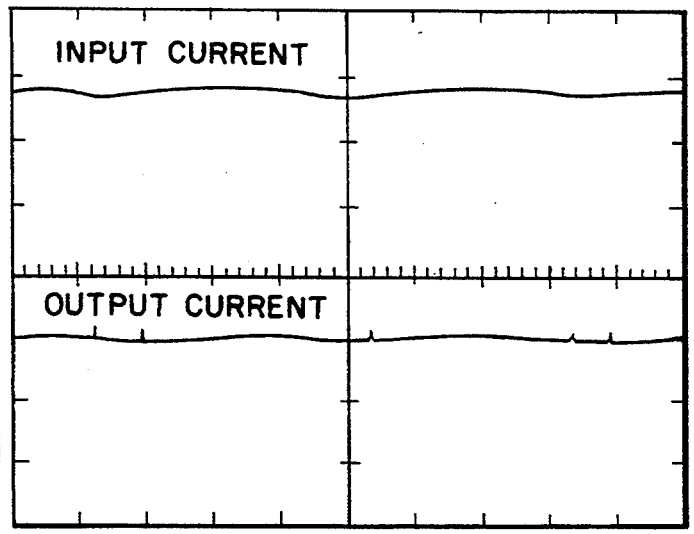
Figure 10A:
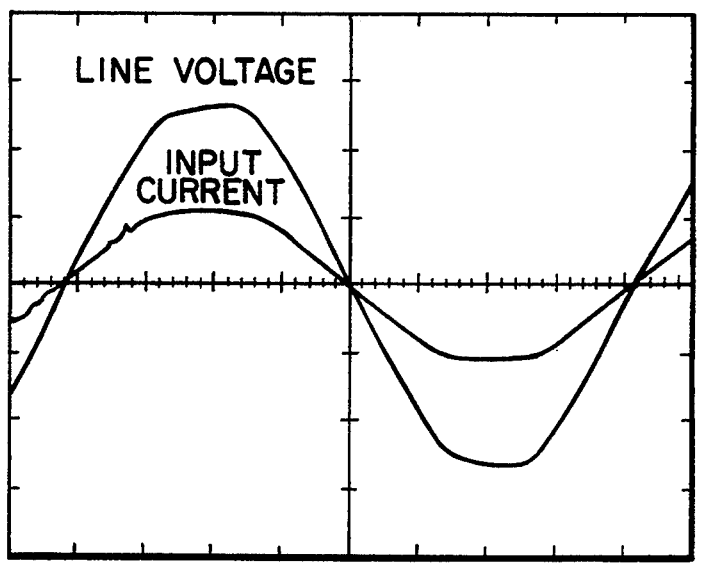
FIGS. 10a, b and c are graphs of line voltage and input current waveforms measured for different output power levels at 150 W (input current: 2A/div.), 100 W (input current: 2A/div.) and 50 W (input current: 1A/div.), respectively, with line voltage: 50 V/div, and time scale: 2 ms/div. for each graph.
Figure 10B:
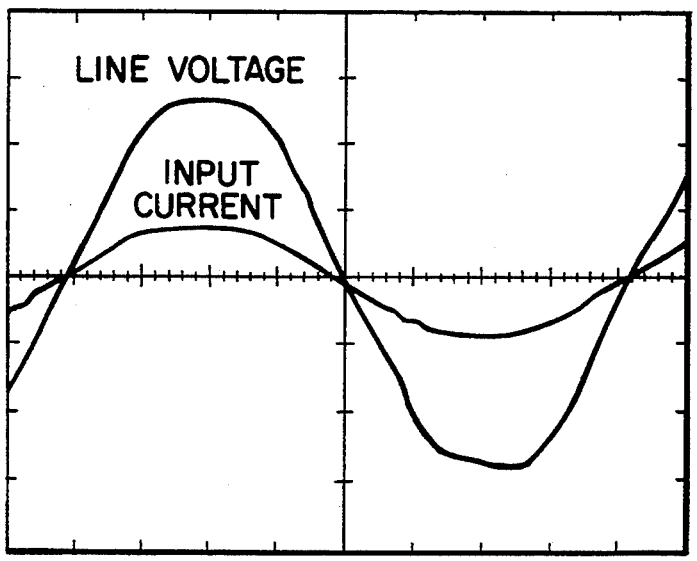
Figure 10C:
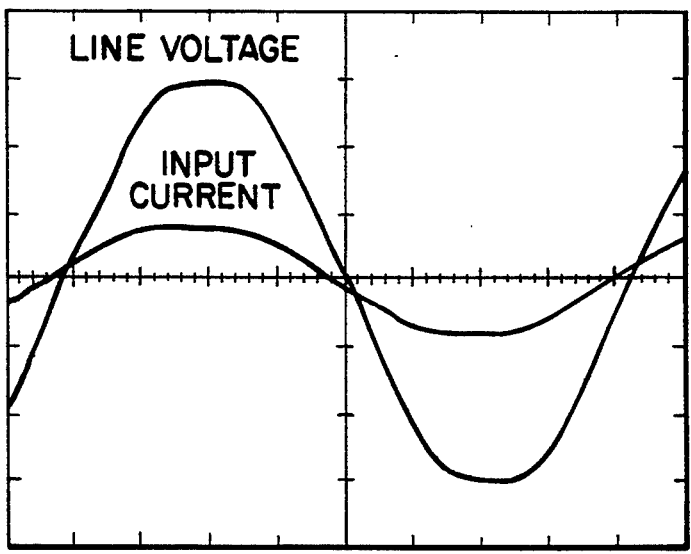

Experimental waveforms are shown in FIGS. 8, 9 and 10. Input current and line voltage at full output power of 200 W are plotted in FIG. 8. As can be seen, input current follows line voltage very well and is ripple free. No filter capacitor was used in front of the bridge rectifier for additional switching current ripple filtering.

Input and output current waveforms during the line period are plotted in FIG. 9a. Switching current ripple is significantly reduced in both currents as can be seen from the waveforms during switching period shown in FIG. 9b. The switching ripple in the input current is 120 mA at 3.3 A peak value which is only 3.6%, and ripple in the output current is 400 mA at 8 A peak value which is 5% at output power level of 200 W. Both switching ripple currents are residual ripple currents and proportional to their peak currents [Z. Zhang, supra]. Therefore, the percentage of the switching ripple currents in both inductors, relative to their peak values, is constant. This means that if peak currents are reduced twice, the same amount of reduction will be in their corresponding switching ripple components.

In FIG. 10, input current and line voltage waveforms are plotted for different output power levels of 150 W, 100 W and 50 W. In all three cases, the input current is indeed proportional to line voltage and in phase, and zero input and output switching current ripple (not shown) are preserved. For the output power level of 50 W (25% of the full power), the input current leads the line voltage for a small angle of 6.3° as a consequence of the energy transfer capacitor which is designed for the full power. This phase lead produces displacement factor $\cos\phi = 0.994$ which is acceptable. Comparing waveforms from FIG. 9b and FIG. 8b, the switching ripple component is 10 times smaller when integrated magnetics are used instead of separate inductors even though the same effective inductance $L_1$ is used in both cases. Also, switching ripple component in the output current is almost eliminated so improvement in the output current waveform is about two orders of magnitude.

Conclusion

A Cuk converter (isolated or nonisolated version) operated in the DICM behaves as an ideal current shaper and performs current shaping automatically with no current feedback control. By keeping duty ratio and switching frequency constant, input current is indeed linearly dependent on line voltage since the input port of the Cuk converter inherently emulates a resistor, and yet voltage feedback control may be applied to the duty ratio in order to regulate output voltage in the presence of varying line voltage and/or the presence of varying loads.

High in-rush current during start-up as well as overload current during short circuit, which are serious drawbacks in the boost converter, are reduced in the Cuk converter by almost two orders of magnitude. This is because the input inductor is connected to the energy transfer capacitor, which is three orders of magnitude smaller, instead of directly to the output bulk capacitor as in the boost converter.

Integrated-magnetics in an isolated version of the Ćuk converter is successfully applied in current shaping applications where isolation is required. Essentially zero input and output switching current ripples are obtained for all operating conditions without additional filtering or increase of the switching frequency while still keeping the size of magnetics small.

Experimental results demonstrate high performance of the current shaper based on a Ćuk converter with integrated magnetics operating in DICM.

The full advantage of the Ćuk converter with integrated magnetics used in current shaping applications are: current shaping without current feedback control; zero input and output switching current ripple; isolation between line and load; wide range of input and output voltages; small size of magnetics even at switching frequency as low as 35 kHz; natural protection against start-up in-rush current or short-circuit condition and high overall efficiency.

We claim:

1. A process for ideally providing a DC voltage to a load from a rectified AC power line source with unity power factor using a Ćuk dc-to-dc converter which comprises an input inductance, an energy transfer capacitance, an output inductance, and an energy storage capacitance in parallel with a load, means for connecting said input inductance, said energy transfer capacitance, said output inductance and said load in series to form a series circuit, said series circuit having a junction between said input inductance and said energy transfer capacitance, and a junction between said energy transfer capacitance and said output inductance, and switching means for alternately connecting said junction between said input inductance and said energy transfer capacitance, and said junction between said energy transfer capacitance and said output inductance, to return current paths for said rectified AC power line source and load, said process comprising operation of said switching means in a discontinuous inductor current mode at a constant switching frequency with a controlled duty ratio which remains constant for a given condition of AC power line voltage and load current, thereby providing ac-to-dc conversion with unity power factor, and making the average input current to the Ćuk converter directly proportional to rectified AC power line voltage without any need for input current feedback control, said Ćuk converter having nonpulsating input current even in discontinuous inductor current mode unlike all other switching converters having pulsating input current in discontinuous inductor current mode, thereby minimizing high frequency harmonic currents fed back to the AC line.

2. A process as defined in claim 1 wherein said Ćuk converter is provided with an energy transferring capacitance that is smaller by two orders of magnitude than said energy storage capacitor, whereby the need for special circuitry to limit the high input in-rush current during start-up or shorted load conditions is obviated.

3. A process as defined in claim 1 wherein said input and output inductances of said Ćuk dc-to-dc converter are coupled on a common core designed to provide zero-ripple current through said input inductor, thereby eliminating the high frequency harmonic ripple currents through said input inductance entirely without the need for additional input current filtering and with input inductance a few orders of magnitude smaller than required for the same zero ripple condition without coupling, thereby minimizing current distortion occurring at cusps of AC line voltage without the need to increase switching frequency.

4. A process as defined in claim 3 wherein said energy transfer capacitance is divided into two capacitances, and further comprises an isolation transformer having a primary winding connecting first of said two capacitances to said return current path for said source and having a secondary winding connecting a second of said two capacitances to said return current path for said load.

5. A process as defined in claim 4 wherein said input and output inductances of said Ćuk converter are coupled on a single magnetic core together with said isolation transformer and designed to meet zero-ripple conditions simultaneously on input and output inductances, thereby eliminating high frequency harmonic currents from both input and output without the need for additional filtering.

6. A process as defined in claim 1 further comprising operation of said Ćuk dc-to-dc converter with feedback voltage control of said duty ratio to regulate said DC voltage against AC line voltage and load current changes.

* * * * *